United States Patent
Sanjeev

(10) Patent No.: US 8,620,290 B2
(45) Date of Patent: Dec. 31, 2013

(54) METHOD AND SYSTEM FOR SCHEDULING PHONE CALL USING SMS

(75) Inventor: Kumar Sanjeev, San Ramon, CA (US)

(73) Assignee: Cellco Partnership, Basking Ridge, NJ (US)

(*) Notice: Subject to any disclaimer, the term of this patent is extended or adjusted under 35 U.S.C. 154(b) by 553 days.

(21) Appl. No.: 12/709,013

(22) Filed: Feb. 19, 2010

(65) Prior Publication Data

US 2011/0207438 A1  Aug. 25, 2011

(51) Int. Cl.
*H04M 3/42* (2006.01)
*H04M 1/64* (2006.01)
*H04M 3/00* (2006.01)
*H04W 4/00* (2009.01)
*H04B 7/00* (2006.01)
*H04L 12/16* (2006.01)

(52) U.S. Cl.
USPC ........ 455/416; 455/414.1; 455/466; 455/521; 370/260; 370/261; 370/262; 370/264; 370/266; 379/88.17; 379/88.22; 379/202.01; 379/210.01; 379/214.01

(58) Field of Classification Search
USPC ........... 455/412.1, 459, 514, 414.1, 466, 521, 455/416; 379/88.17, 88.22, 202.01, 201.02, 379/214.01, 203.01, 204.01, 205.01, 379/210.01, 260, 261; 709/219, 204; 348/14.09, 14.1; 370/260, 261, 262, 370/264, 265, 266
See application file for complete search history.

(56) References Cited

U.S. PATENT DOCUMENTS

| | | | |
|---|---|---|---|
| 6,005,845 A | 12/1999 | Svennesson et al. | |
| 6,577,874 B1* | 6/2003 | Dailey | 455/521 |
| 2004/0240642 A1* | 12/2004 | Crandell et al. | 379/88.22 |
| 2008/0167005 A1 | 7/2008 | Gilzean et al. | |
| 2009/0060162 A1* | 3/2009 | Lachhiramka | 379/214.01 |
| 2011/0195728 A1* | 8/2011 | Sweatman et al. | 455/466 |
| 2011/0305331 A1* | 12/2011 | Hughes et al. | 379/202.01 |

FOREIGN PATENT DOCUMENTS

WO   WO 2007/033495 A1   3/2007
WO   WO 2008/0137763 A2   11/2008

OTHER PUBLICATIONS

Yen-Churn Ngeow et al., "Experimental Finding in Implementing 'CommRobot'—Comparing IMS and Proprietary Solution," Proceedings for the 2009 IEEE 9th Malaysia International Conference on Communications, Dec. 15-17, 2009, pp. 506-511.
Extended European Search Report issued in European Patent Application No. EP 11001366.1 dated Jun. 29, 2011.

* cited by examiner

*Primary Examiner* — Inder Mehra

(57) ABSTRACT

A schedule for a desired call, obtained, for example as an SMS message sent from a user's mobile station, enables a server to automatically initiate set-up of a voice call for the user's mobile station at a scheduled time selected by the user and indicated in the message. The user can specify time and a telephone number for the call, in advance, in the call scheduling request message. However, at the time of the call, the user does not need to read a reminder or dial the call. The call scheduling and automatic set-up services described by way of examples herein may be very useful, for example, for attending important conference calls. This may also be very useful for setting a reminder to call a special person to wish him/her well on his/her birthday/anniversary etc.

11 Claims, 4 Drawing Sheets

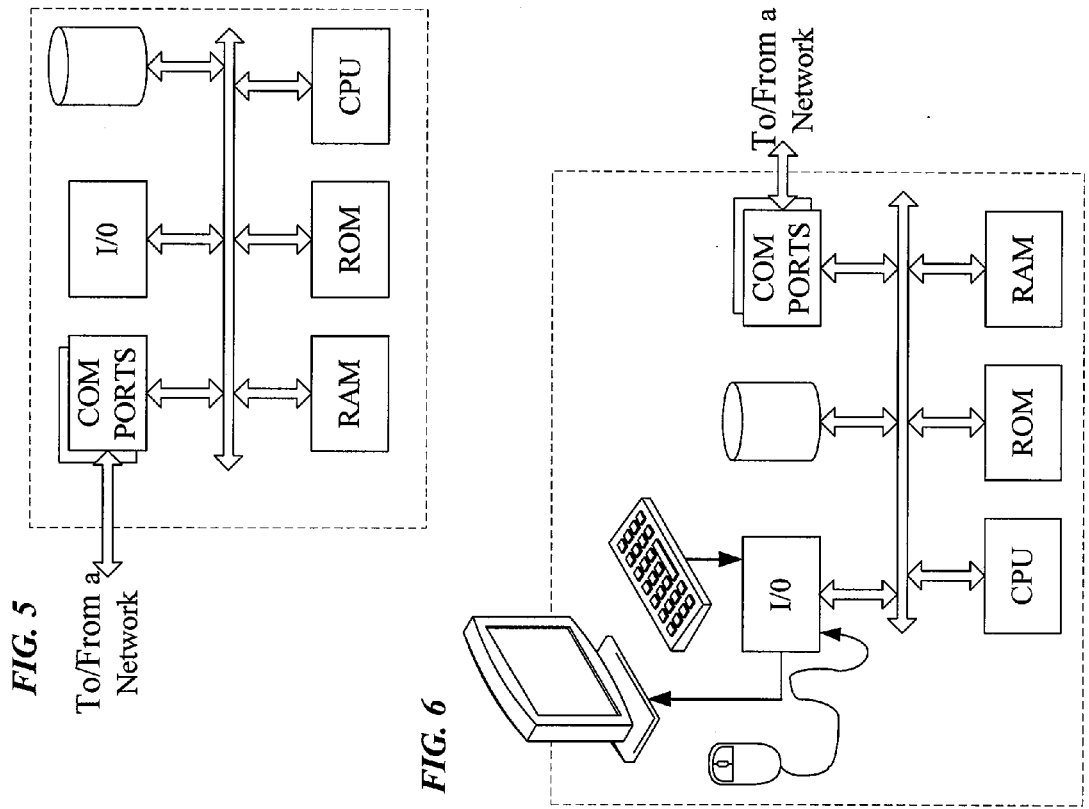
FIG. 5
FIG. 6
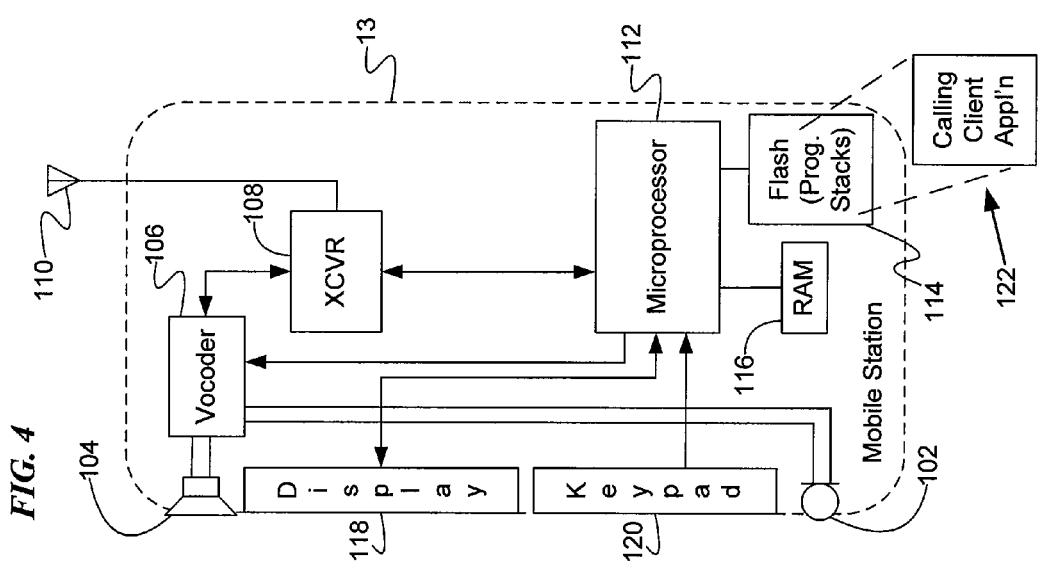
FIG. 4

METHOD AND SYSTEM FOR SCHEDULING PHONE CALL USING SMS

TECHNICAL FIELD

The present subject matter relates to techniques and equipment to obtain a schedule for a desired call from a user's mobile station, and at the scheduled time, to automatically initiate set-up of the call for the user's mobile station.

BACKGROUND

The are many instances where it is desirable for people to schedule a time (e.g. date and time of day) for a voice call with one or more other parties. Traditionally, people use a calendar, whether in hard-copy form or automated on a computer or mobile station device, to setup a notation or reminder. In a calendar program, conference meeting entry might include all details for the call, like phone number and date/time of reminder/meeting. However, the user has to manually dial the phone number to either attend a conference call. Similar process may be used for other scheduled calls, like a call to wish somebody well on his/her birthday or other special occasion. For many of these calls it is important that the call occurs promptly as scheduled. For example, a business conference call meeting is very time sensitive and a participant usually can not afford to be late. If the participant is driving during this time, then they may have to literally stop and dial-in to connect to the conference call.

SUMMARY

Hence, it would be useful to have a more convenient way to make calls at scheduled times. The teachings herein therefore provide improved methods and equipment for automatically scheduling a voice call, e.g. using a mobile messaging service message with the information as to the other party and the schedule for the call, and for subsequently initiating the call between the user's mobile station and another telephone station identified in the message at the scheduled time.

For example, a disclosed method for scheduling and setting up a voice call involves receiving a call scheduling request, sent as a mobile messaging service message from a user's mobile station through a mobile communication network. The call scheduling request includes a scheduled time for the call and a telephone number for enabling communication with at least one other party intended to be on the call. The call scheduling request also enables identifying the user's mobile station. A server in communication with the network automatically initiates set-up of a voice call at the scheduled time for the user's mobile station and using the telephone number included in the call scheduling request message.

In specific disclosed examples, the mobile messaging service message is a short message service (SMS) message. Although the examples often focus on a call between the user's mobile station and another telephone device (e.g. another mobile station or a landline telephone), the voice call may enable the mobile station to communicate with other voice telephone communication equipment such as that of call-in conference service.

The voice call may be initiated from the server at the scheduled time, in a variety of ways. In one disclosed example, at the scheduled time, the server initiates a first call to the user's mobile station and another call using the telephone number from the call scheduling request message, e.g. to the telephone of the other party or to the conference equipment. Once started, the server enables joining of the two calls to form the scheduled voice call. In another alternative, at the scheduled time, the server sends an instruction through the mobile communication network to the user's mobile station to cause that station to initiate the scheduled voice call using the telephone number from the call scheduling request message.

The disclosure herein also encompasses appropriately configured hardware. For example, a platform operating as the server might be configured by programming or other means to be able to perform functions similar to steps of the call scheduling and set-up method. Other concepts relate to unique software for implementing call scheduling and set-up, either from a server only perspective or from a perspective in which the server instructs the mobile station to initiate call set-up. A software product, in accord with such a concept, includes at least one machine-readable medium and programming carried by the medium for implementing the call scheduling and set-up functionalities.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 4 is a high-level functional block diagram of an example of a mobile station.

FIG. 5 is a simplified functional block diagram of a computer that may be configured as a host or server, for example, to function as the VASP application server for the call scheduling and set-up service in the system of FIG. 1.

FIG. 6 is a simplified functional block diagram of a personal computer or other work station or terminal device, although that device may also be configured as a server.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various exemplary systems and methods discussed in this section relate to receiving a call scheduling request message with a phone number, a time (e.g. date and time of day, duration or wait time from current time, or the like) for a scheduled call at a server of a value added service provider or the like, and then the server side initiates action to connect the parties at the scheduled date and time. In the specific examples, the mobile station sends the call scheduling request as an short messaging service (SMS) message. The voice call may be set-up by the server equipment, for example, by calling the mobile customer as well as the other party or conferencing bridge and then bringing the two calls together. Alternatively, the server may send an SMS or other type of instruction message to the user's mobile station to trigger the mobile station to make the actual voice call at the scheduled time.

With the present technique scheduling a call with SMS, the service will connect both parties automatically, for example, at a user specified time and day. This will take an Outlook® type of calendar reminder functionality for a conference call to a higher level of usefulness, where people do not need to even remember a conference call number, respond to a pop-up or read a schedule item to obtain the call-in number. For example, a mobile user driving to work who needs to join a conference call while still on the way to work can send an SMS message to the server ahead of time with conference call information like phone number, date/time of call. Then, the mobile user will be automatically connected to the conference at correct time. There is no need for the driver/user to exit the roadway and make the actual call or to trying to call-in while driving. This service can also be used to set-up a reminder for calling a friend or loved one on his/her special day so that the user can be connected automatically with the friend or loved one.

Figure 1:
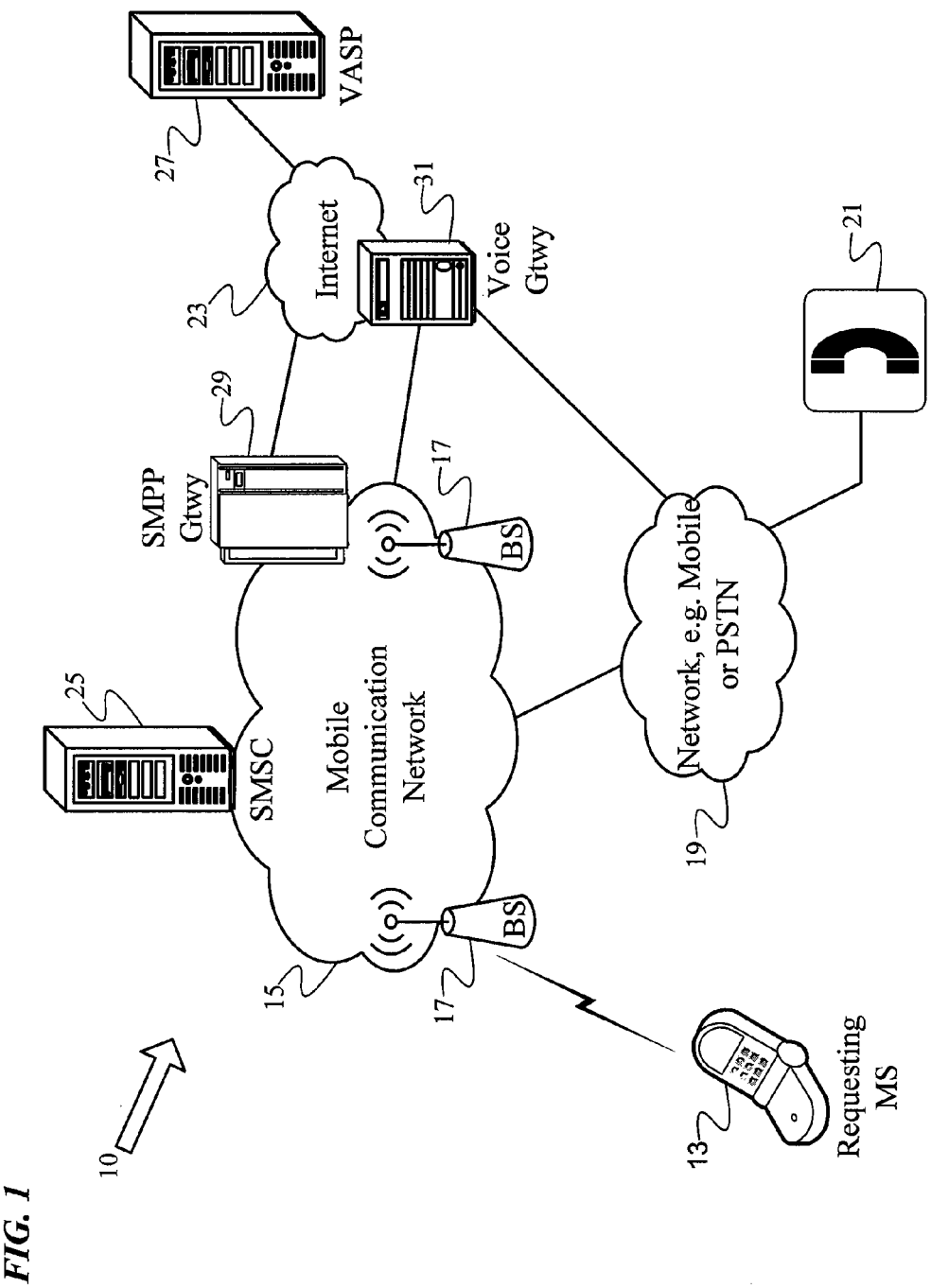
FIG. 1 is a high-level functional block diagram of an example of a system including a wireless mobile communication network and other networks and elements, which together may implement a call scheduling and scheduled call set-up procedure.

With that introduction, reference now is made in detail to the examples illustrated in the accompanying drawings. FIG. 1 illustrates a system 10 supporting a variety of mobile communication services for users of any number of mobile stations, including the call scheduling and automatic call set-up functionalities of interest here. The drawing shows one mobile station (MS) 13, by way of example, as well as a mobile communication network 15. The network 15 provides mobile wireless communications services to that station as well as to other mobile stations (not shown), for example, via a number of base stations (BSs) 17. The present techniques may be implemented in any of a variety of available mobile networks 15 and/or on or for any type of mobile station compatible with such a network 15, and the drawing shows only a very simplified example of a few relevant elements of the network 15 for purposes of discussion here.

The network 15 allows users of the mobile stations such as 13 to initiate and receive telephone calls to each other. The network 15 also allows users of the mobile stations as well as through one or more other networks 19 offering voice telephone type services, such as the public switched telephone network (PSTN) or another mobile network, with telephone stations or other voice communication equipment served by or through such other network(s) 19. The telephone station symbol 21 is generally intended to represent various forms of telephones served via the other telephone network 19 as well as other types of voice equipment such as equipment of a call-in conference service, for purposes of later discussion.

The network 15 typically offers a variety of data services via the Internet 23, such as downloads, web browsing, email, etc. Modern implementations of the network 15 also allow voice over data communication, typically as voice over internet protocol (VoIP) communications, via a data session through the network 15 and the Internet 23 for those mobile stations having data communication capability and appropriate voice over packet protocol functionality. As will be discussed in detail later, a call set-up for the mobile station 13 at a scheduled time may be a regular voice call or a voice over data call.

The network 15 also supports a mobile messaging service, such as Short Message Service (SMS) type text messaging, between mobile stations and similar messaging with other devices via the Internet 23. The messaging service communications are utilized here to communicate a scheduling request from the mobile station 13 with a time for the voice call and a telephone number to be used for the voice call. In one implementation, the server may send an instruction message back to the user's mobile station 13 to cause station 13 to initiate the call itself. In the examples, these message communications use the SMS capabilities of the network 14. Today, the network 15 may offer one or more advanced types of mobile messaging services, such as enhanced messaging service (EMS) and/or multimedia messaging service (MMS). EMS is an application-level extension to SMS for cellular phones available on GSM, TDMA and CDMA networks. MMS is a mobile messaging type service that supports communications of messages carrying multimedia content, such as audio, picture and video content. The present teachings encompass use of EMS, MMS or another mobile messaging service, although as noted, the examples discussed in more detail below will utilize SMS.

Wireless carriers developed SMS to transmit text messages for display on the mobile stations. In many existing network architectures, the SMS traffic uses the signaling portion of the network to carry message traffic between a Short Message Service Center (SMSC) 25 and the mobile stations. The SMSC supports mobile station to mobile station delivery of text messages. The SMSC also supports communication of messages between the mobile stations and devices coupled to other networks. Here, the SMS capability of the network 15 is used for message communications relating to scheduling of calls and may be used in at least one type of procedure for actual set-up of the calls at the appropriate times. Those messages are communicate through one or more SMSCs of the network 15, represented generically and collectively by the SMSC 25 in the drawing.

The call scheduling service may be offered by a Value Added Service Provider (VASP). In general, a VASP is an entity that provides content and/or other services to clients, generally network providers as well as end users, without actually performing the role of the network carrier or provider. A carrier/network operator may also represent one or more entities that utilize a VASP, for example, in order to provide improved content to their subscribers over their network rather than investing the capital to offer such services directly. The VASP typically operates a server which communicates through an IP network such as the Internet, and through a gateway and the network 15 with subscribers' mobile stations. The example of a system 10 for offering the call scheduling and set-up service utilizes a VASP to provide the service, and the VASP server equipment is generally represented by the one server 27 in the drawing, although the VASP offering the call scheduling and set-up service may deploy appropriate server applications on a number of server platforms. Also, although shown as communicating via the public Internet, the VASP server 27 could utilize a private intranet for communications with the mobile network 15.

The SMSC 25 communicates with external equipment, typically computers hosting the ESME applications or the like, via an IP network, in this case the public Internet 23. As will become apparent, this type of messaging service communications includes communications with the VASP server 27. To provide an interface for such communications, the network 15 includes a gateway server. In the example, SMSC will send and receive messages to servers or terminal devices accessible via Internet Protocol (IP) packet data through the Internet, via a Short Message Peer-to-Peer Protocol (SMPP) type gateway. Although there may be any number of gateway servers, the drawing shows one such SMPP at 29, gateway for convenience.

The SMPP gateway 29 communicates with the SMSC 29 via an internal IP link or network (portion of the cloud representing the network 15), and the SMPP gateway 29 communicates with other equipment such as VASP server 27 through the public Internet 23. In this way, the SMPP gateway 29 allows the SMSC 25 to receive and send messages in IP packet format. The SMPP gateway 29 is the entity within the wireless network 15 that acts as an intermediary between the wireless service provider network 15 and the external application server network for SMS message communications. For example, the SMPP gateway 29 converts messages in protocol(s) used by ESME or other VASP applications, e.g. Extensible Markup Language (XML), Hypertext Mail Protocol (HTMP), etc., to and from SMPP protocol used for SMS communications between the SMPP gateway 29 and the SMSC 25. Within the network 15, the SMPP messages ride on IP transport.

Details of the network communications between routing/switching nodes of the network 15 and the SMSCs and of the IP switching/routing communications to and from the gateways are omitted from the drawing for simplicity, as these are conventional in nature.

Although a variety of other numbers or identifiers may be assigned to a mobile station for various network purposes, a Mobile Directory Number (MDN) or Mobile Telephone Number (MTN) is the telephone number assigned to a mobile station that a calling party or device inputs in order to call or send a message to the particular mobile station. To call the mobile station 13, for example, a user of a PSTN telephone or of another mobile station dials the MDN associated with the mobile station 13. To send a SMS message or other type of mobile messaging service message to the mobile station 13, as another example, typically entails input of the MDN of that mobile station.

A SMS message includes source and destination address fields. For messages from a user device, the source address is the MDN of the sending customer's mobile station. For example, a SMS message sent from the mobile station 13 includes the MDN of the mobile station 13 as the identifier of the source of the message. The destination address may be a MDN of a destination station or some other form of recognizable address. Of note for purposes of this discussion of call scheduling, one type of alternative address is a short code, typically four, five, six, eight, or twelve digits. The network 15 routes a SMS message with a MDN destination address all the way through to the addressed mobile station, however, the network 15 routes a SMS message with a short code destination address to a service provider application corresponding to the short code.

SMS routing thus allows use of short codes as a mechanism to route messages to/from a service provider, as opposed to communication of messages between end user devices. For this purpose, the short code is recognized by a control application as being a message to a service provider as opposed to a message between SMS user devices, and the control application translates the short code to direct the message to the appropriate service provider platform. Depending on the service, the application may process the message, e.g. to count votes; or the network application may translate the short code to a destination address, e.g. an IP address of an external customer's server, such as the ESME server of a VASP.

In the example, the call scheduling service application on server 27 would have an assigned short code. Hence, the SMSC 25 routes outgoing messages received through the mobile network 15 from mobile stations like 13, which have a short code for the message destination address of the appropriate VASP call scheduling application, through the gateway 29 and the Internet 23 to the VASP server 27. Messages sent by the VASP server 27 for mobile stations like 13, would be sent through the Internet 23 to the SMPP gateway 29, which forwards them to the appropriate SMSC 25. Each such incoming message would include the MDN of a mobile station, and the SMSC and other elements would deliver the SMS message to the appropriate station based on the MDN as the message destination address.

As noted earlier, the scheduled call may be a call to an actual telephone device of another party or a call to some other form of telephone equipment for voice communication with one or more other parties intended to be on the call, such as call-in equipment of a call conference service. For simplicity of further discussion of the examples, however, we will assume that the equipment 21 intended as the other terminal of scheduled call will be a telephone of the other party intended to be on the call.

The actual voice call may be set-up at the scheduled time in a variety of ways. Today many user devices and networks support voice over data communication, typically as voice over internet protocol (VoIP) communications, via a data session through the network(s) serving the requested party. A call using VoIP bearer transport for the exchange of audible communications is set-up via an exchange of signaling messages in accord with a standardized signaling protocol, such as the session initiation protocol (SIP). Consider first a situation in which both the user's mobile station 13 and the other party's telephone 21 are capable of VoIP communications. For example, the devices may be similar mobile stations served by network 15, the telephone 21 may be a similar mobile station that obtains data services through another mobile network at 19, or the telephone 21 may be served through an IP network. In such a situation, the server would send SIP invite messages and exchange other SIP signaling messages with the station 13 and the telephone to initiate a voice communication over IP packets between the two devices. Once the VoIP call is set-up, the server would not longer be involved, packets would flow back and forth between the mobile station 13 and the telephone 21 without going through the VASP call scheduling server 27.

However, there may be many situation where or both devices or their serving networks do not support VoIP communications. For VoIP calls to/from telephone equipment on the legacy PSTN network or to other devices that do not have VoIP capability, service providers have deployed gateways that provide voice network interfaces to and from the Internet 23. For illustration and discussion purposes, the drawing shows one such voice gateway at 31.

Assume by way of another example, that the telephone 21 is a legacy type telephone served by the PSTN as the other network 19. The VASP server 27 would do the SIP signaling exchange with the mobile station 13 as in the earlier example, but the SIP signaling for the link to the other party would go through the voice gateway 31. The gateway 31 would make a regular telephone call to the telephone 21 through the PSTN 19, and VoIP packets for the call would be exchanged between the mobile station 13 and the gateway 31. The gateway 31 would provide the two-way conversions between the protocols for communication via the PSTN and those used for VoIP communication via the Internet 23. If the mobile station 13 does not have VoIP capabilities, then a gateway like 31 could be used to set-up the leg of the call for the mobile station 13, in a similar fashion.

Another way to set-up the call between the mobile station 13 and the telephone 21, would be to trigger the mobile station to automatically make the call. With this later approach, the call would go through the networks 15 and 19 like any other regular voice call.

Figure 2:
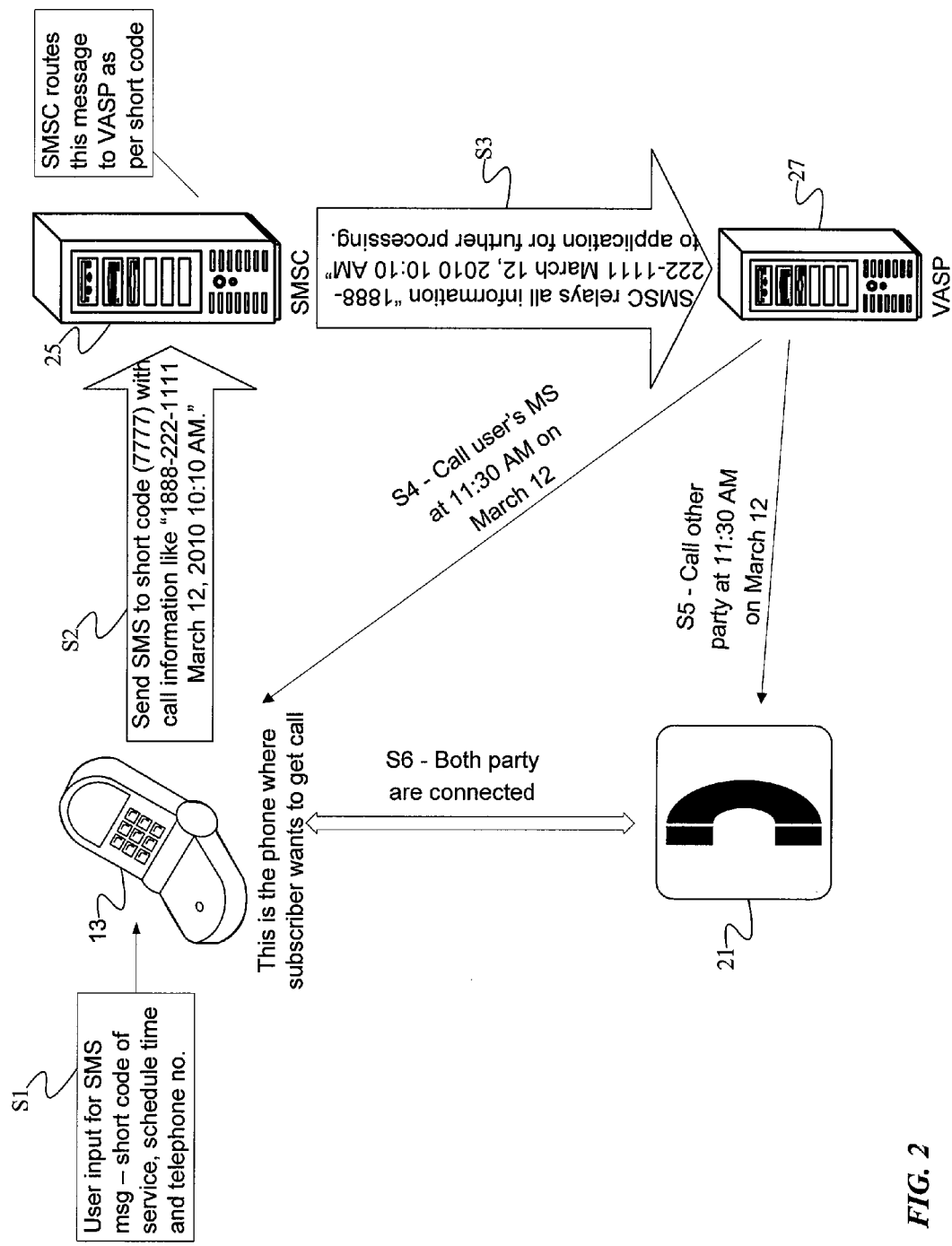
FIG. 2 is a high-level of a first example of a call scheduling and scheduled call set-up procedure, as might be implemented in the system of FIG. 1.

It may be helpful now to consider some examples of the steps involved in scheduling a call and automatically setting up the call at the scheduled time. As a first example, FIG. 2 is a flow chart illustrating a call scheduling and scheduled call set-up procedure. For purposes of this example, we will assume that the user of mobile station 13 would like to schedule a telephone call with the user of telephone 21, although as noted the call could go to a variety of other types of equipment instead of the telephone 21. Also, for convenience, we will assume that both devices are capable of VoIP type voice call communications, for example, that both devices are mobile stations served networks 15 and/or 19 that provide data services which may be used for VoIP call communications.

In the example of FIG. 2, the initial step S1 involves the user operating the mobile station 13 to initiate a SMS message to the VASP server 25, where the user inputs for the short code of the service, the schedule time and the telephone number of the telephone 21. In the example, the schedule time is a date and a time of day, but other time input formats could be used. The user's operation to initiate the SMS message and input the scheduling information utilize the user interface elements such as keys and display of the mobile station 13 and the programming of the mobile station that enables it to handle SMS messages, in the normal manner just like inputting any other SMS message. When the user has completed the message input at S1, then the user activates the mobile station 13 to send the message to and through the mobile communication network 15 (FIG. 1), for example, by pressing an OK key or a SEND key on the station 13.

The illustration in the drawing shows an exemplary four digit short code 7777 as the short code for the call scheduling service hosted by the VASP. The illustration shows the exemplary destination telephone number for telephone 21 as "1888-222-1111," and the illustration shows the exemplary scheduled time information "Mar. 12, 2010 10:10 AM."

Hence, in step S2, the mobile station 13 send the SMS message using the short code 7777 as the destination address and containing scheduled call request information like "1888-222-1111 March 12, 2010 10:10 AM." The mobile communication network 15 routes the SMS message from mobile station SMSC. The SMSC 25 routes this message to VASP as per short code. In the system 10 of FIG. 1, the SMSC 25 sends the message in SMPP format to the gateway 29, which makes any necessary protocol conversions and forwards the message over the Internet 23 to the VASP server 27. In this way, the SMSC 25 relays all the call scheduling request information "1888-222-1111 Mar. 12, 2010 10:10 AM" to the call scheduling and set-up application on the VASP server 25, for further processing, as shown at step S3 in FIG. 2.

From the server's perspective, at S3 the server 25 receives a call scheduling request, that was originally sent as a mobile messaging service message from a user's mobile station 13 through a mobile communication network. The call scheduling request includes the scheduled time for the call and a telephone number for enabling communication with at least one other party intended to be on the call, in this case the user of the telephone 21. The call scheduling request also enables identifying the user's mobile station, typically from the MDN of the mobile station 13 included as the origination address in the SMS message that station 13 sent through the network 15 at step S2.

At the scheduled time, say Mar. 12, 2010 10:10 AM in our example, the VASP server 25 for the call scheduling and set-up service will automatically initiate set-up of a voice call at the scheduled time for the identified mobile station 13 and using the telephone number included in the request message. In the example, the mobile station 13 is identified by its MDN type telephone number the telephone number included in the request message is the number for the telephone 21. In the example, when the scheduled time for the call arrives, the server 25 calls the user's mobile station 13 at step S4, and the server 25 calls the telephone 21, using the respective telephone numbers.

In our VoIP example, step S4 entails SIP signaling to invite the mobile station 13 to join in the voice call, and step S5 would entail SIP signaling to invite the telephone 21 of the other party to join in the voice call. Once the station 13 and telephone 21 have joined, they can communicate directly with each other through the network(s). The telephone 21 will ring or generate another appropriate alert for the called party, and the mobile station 21 may provide a ring or other alert for the user. If both the user and the party using the telephone answer, then they can communicate audibly via the voice call, just like on a regular phone call connection (S6).

Figure 3:
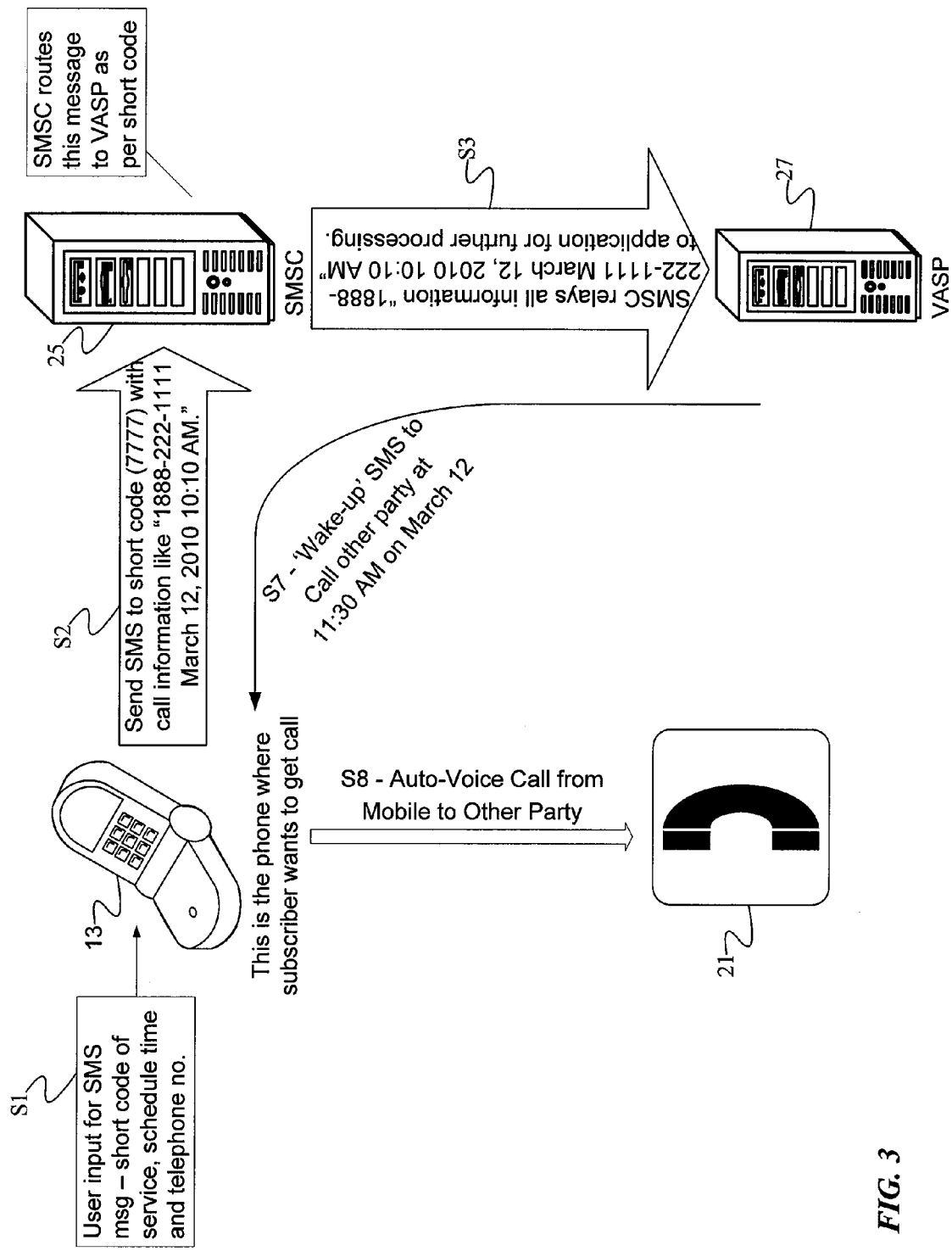
FIG. 3 is a high-level of a second example of a call scheduling and scheduled call set-up procedure, as might be implemented in the system of FIG. 1.

FIG. 3 a second example of a call scheduling and scheduled call set-up procedure. Steps S1 to S3 in this second example are the same as in the example of FIG. 2, however, the server 27 uses a different procedure to automatically initiate set-up of the voice call between the mobile station 13 and the telephone 21, at the scheduled time.

In this example, rather than signaling both end user devices 13 and 21, the VASP server 25 sends an instruction through the mobile communication network 15 to the user's mobile station 13, to cause that station to initiate the scheduled voice call, at the scheduled time. The transmission of the instruction could use various types of communication supported by the network 15 and the station 13, but in our example, the instructions arrives at the mobile station as an incoming SMS message.

The server 25 would send the message in an appropriate format through the Internet 23 to the gateway 29. The gateway would convert the message to SMPP form if needed and route the message to the SMSC 25. The message would include the MDN of the mobile station 13 as the destination address, and based on that address, the SMSC and other elements of the mobile communication network 15 would deliver the message content as an SMS message over the air to mobile station 13.

The instruction message sent from the server 27 will include an activation or 'wake-up' code. When the SMS message is received at the mobile station 13, the code serves as an indication to that station that the message is not a regular text message for alert and display purposes. The code identifies or maps to an application resident in the mobile station 13, and recognition of the code in the message will cause the mobile station to activate or 'wake-up' that application for execution. In this case, the application is a client application for initiating a call through the network 15 to a telephone number contained in the SMS instruction message, in this case the telephone number of the telephone 21.

Hence, in the process flow of FIG. 3, at 11:30 AM on March 12, the server sends a 'Wake-up' SMS instruction message to the mobile station 13, to instruct that station to call other party (S7). The SMS instruction message includes the telephone number of the other party, in this case the number "1888-222-1111" for the telephone 21. The client application for this calling service enables the mobile station to extract the telephone number and initiate a call through the mobile communication network 15, in an otherwise normal manner (S8). The application would also cause the mobile station to generate a call alert, such as a ring, to inform the user of the call. The network would establish a voice call to the telephone 21, for example, through the PSTN or other network 19 in the example of FIG. 1. If the party using that telephone answers the call, then the mobile station user and the other party can communicate audibly via the voice telephone call in a normal manner.

As shown by the discussion of the method of FIG. 3, the call set-up part of the processing may involve an interaction with an appropriately configured mobile station 13. Those skilled in the art presumably are familiar with the structure, programming and operations of such stations. However, for completeness, it may be useful to consider the functional elements/aspects of an exemplary mobile station, at a high-level.

For purposes of such a discussion, FIG. 4 provides a block diagram illustration of an exemplary wireless device 13. Although the wireless device 13 may be a smart-phone or may be incorporated into another device, such as a personal digital assistant (PDA) or the like, for discussion purposes, the illustration shows the wireless device 13 in the form of a handset. The handset embodiment of the wireless device 13 functions as a normal digital wireless telephone station. For that function, the station 13 includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications through network 15 and possibly voice over packet (Internet Protocol) communications if supported by the station 13 and the data services through the network 15.

For digital wireless communications, the handset 13 also includes at least one digital transceiver (XCVR) 108. Today, the handset 13 would be configured for digital wireless communications using one or more of the common network technology types. For example, the handset 13 may be a dual mode device capable of utilizing either or both of CDMA (IS-95, 1XRTT or EV-DO) technologies and 3GPP (LTE/GSM/UMTS) technologies. For that purpose, the transceiver (XCVR) 108 could be a multimode transceiver, or the mobile station 13 may include two or more transceivers each of which supports a subset of the various technologies or modes. The concepts discussed here encompass embodiments of the station 11 utilizing any digital transceivers that conform to current or future developed digital wireless communication standards. The mobile station 13 may also be capable of analog operation via a legacy network technology, at least for voice telephone communications.

The transceiver 108 provides two-way wireless communication of information, such as vocoded speech samples and/or digital message information, in accordance with the technology of the network 10. The transceiver 108 also sends and receives a variety of signaling messages in support of the various voice and data services provided via the station 13 and the communication network, in this case. In an implementation of the call set-up communication using SMS, the capabilities of the transceiver 108 also enable sending and receiving of SMS messages, including the request message for scheduling a call and may enable receipt of the call set-up instruction in an incoming SMS message if the implementation relies on activation of the mobile station 13 to make the actual call to the telephone 21. Each transceiver 108 connects through RF send and receive amplifiers (not separately shown) to an antenna 110. In the example, the transceiver 108 is configured for RF communication in accord with a digital wireless protocol, such as the current CDMA and 3GPP protocols.

The station 13 includes a display 118 for displaying messages, menus or the like, call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a stylus and touch sensitive display screen, as in a PDA or smart phone. In addition to normal telephone and data communication related input/output (including message input and message display functions), the user interface elements also may be used for display of menus and other information to the user and user input of selections, for example, including any needed to select the call scheduling service and input the number of the other party and the date and time information for the schedule request message sent to the VASP server 27.

In the example, a microprocessor 112 serves as a programmable controller or processor for the wireless device 13, in that it controls all operations of the wireless device 13 in accord with programming that it executes, for all normal operations, and for operations involved in the authentication and identification procedure under consideration here. In the example, the wireless device 13 includes flash type program memory 114, for storage of various "software" or "firmware" program routines and mobile configuration settings, such as mobile telephone number (MTN or MDN), etc. The wireless device 13 may also include a non-volatile random access memory (RAM) 116 for a working data processing memory. The RAM, for example, may store an assigned IP address for the duration of a data registration on the network 10 as might be used for VoIP communications for a call scheduled and set-up by the service. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the mobile station 100 includes a processor, and programming stored in the flash memory 114 configures the processor so that the mobile station is capable of performing various desired functions, including in this case the functions involved in the call scheduling service. For the procedure of FIG. 2, the programming may simply be the regular programming of the mobile station, for example, that used to enable regular SMS message input and transmission through the network 15 and that used for VoIP communication and related SIP type call set-up signaling. In the example of FIGS. 3 and 4, however, the executable programming stored in the flash memory 114 also includes a program to facilitate the actual call set-up in response to the command in the SMS message from the VASP server 27. For discussion of a simple example, the program may be a client application 122 for calling another party.

The activation or 'wake-up' code in instruction message would point to the application 122 and cause the microprocessor 112 to retrieve that program from memory 114 and begin execution of the program 122. Execution of the program 122 would cause the microprocessor 112 to extract a telephone number contained in the SMS instruction message. Execution of the calling client application 122 by the microprocessor 112 also causes the mobile station 13 to initiate a call through the mobile communication network 15 and to alert the user of the call.

Thus, the calling client program 122 controls the call set-up in step S8, in response to the SMS instruction message received at the station 13 as a result of step S7, in the process flow of FIG. 3. The structure and operation of the mobile station 11, as outlined above relative to FIG. 4, were described to by way of example, only.

As shown by the above discussion, functions relating to the call scheduling and automatic call set-up in accord with the schedule may be implemented on one or more computers connected for data communication via the components of a packet data network, operating as the server 27 and/or on programmable mobile stations 13, in accordance with the methodology of either FIG. 2 or FIG. 3. An exemplary mobile station device has been discussed above with respect to FIG. 4. Although special purpose devices may be used as the server(s), such devices also may be implemented using one or more hardware platforms intended to represent a general class of data processing device commonly used to run "server" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. stored messages, various scheduling information and destination information for scheduled calls, customer information for users subscribing to the call scheduling services, etc. The software code is executable by the general-purpose computer that functions as the VASP application server for the call scheduling service, and in the example of FIGS. 3 and 4, by the processor of a mobile station device. In operation, the respective programming code is stored within the general-purpose computer platform for the server or within the mobile station terminal device. At other times, however, the software may be stored at other locations and/or transported for loading into the appropriate general-purpose computer system or mobile station device. Execution of server application programming by a processor of the computer platform enables the platform to implement the methodology for call scheduling (FIG. 2) or portion thereof (FIG. 3), and execution of the application by the processor in the mobile station enables that device to initiate a scheduled call (FIGS. 3 and 4), in essentially the manner performed in the implementations discussed and illustrated herein.

FIGS. 5 and 6 provide functional block diagram illustrations of general purpose computer hardware platforms, as might be used as servers or other computers discussed in the examples above. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of scheduling a call and automatically initiating the scheduled call, as outlined above, may be embodied in programming for a server and in the later example programming for a mobile station. Program aspects of the technology may be thought of as "products" or "articles of manufacture" typically in the form of executable code and/or associated data that is carried on or embodied in a type of machine readable medium. "Storage" type media include any or all of the tangible, non-transitory memory of the mobile stations, computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another, for example, from a management server or host computer of the network operator into the computer platform of the server 27 and/or into one or more of the mobile stations such as 13. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

Hence, a machine readable medium may take many forms, including but not limited to, a tangible non-transitory storage medium, a carrier wave medium or a physical transmission medium. Non-volatile tangible non-transitory storage media include, for example, optical or magnetic disks, such as any of the storage devices in any of the mobile stations, various computers or the like, as shown in the drawings. Volatile tangible non-transitory storage media include dynamic memory, such as main memory of such a computer platform or mobile station. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of machine-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM, EPROM and EEPROM, a Flash-EPROM, any other memory chip or cartridge, a carrier wave transporting data or instructions, cables or links transporting such a carrier wave, or any other medium from which a computer can read programming code and/or data. Many of these forms of computer or machine readable media may be involved in carrying one or more sequences of one or more instructions to a processor for execution.

The call scheduling and automatic call set-up technologies outlined above may be modified and/or enhanced in a variety of ways. For example, the description focused on call between the user of a mobile station and a party using another telephone device. However, the principles discussed above can easily be extended to a multi-party conference call scenario where the schedule request would identify two or more other parties and the call set-up procedure would bridge the parties together at the scheduled time of the call. Another enhancement might involve various messages to the other party or parties advising them of and/or confirming the time of the scheduled call. As another example, the number of the other party in the scheduling request might be the call-in number of a bridge for a conference call, the user might just need to input a required conference code (pass code, conference identification or the like). Alternatively, the request message might include the requisite code, in which case, the automated call set-up might input the code in response to prompting by the call conferencing service.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method of scheduling and setting up a voice call, comprising steps of:
   receiving a call scheduling request in a Short Message Service Center (SMSC) in communication with a mobile communication network, sent as a mobile messaging service message addressed to a short code from a user's mobile station through the mobile communication network, wherein the call scheduling request includes a scheduled time for the call and two or more telephone numbers for enabling communication with at least two other parties intended to be on the call;
   identifying, in the SMSC, an application server associated with the short code to which the mobile messaging service message is addressed;
   routing the mobile messaging service message from the SMSC through a packet network to a destination address of the identified application server associated with the short code;
   in response to the routing, receiving in the SMSC from the identified application server through the packet network, a response to the call scheduling request message, wherein the response to the call scheduling request message is automatically transmitted by the application server to the SMSC at the scheduled time;
   identifying the user's mobile station identified in the response to the call scheduling request message; and
   routing from the SMSC to the identified user's mobile station through the mobile communication network the response message for automatically initiating, at the scheduled time, set-up of a voice call communication for the user's mobile station using the two or more telephone numbers included in the call scheduling request message, by sending a mobile messaging service message through the mobile communication network to the user's mobile station to cause the user's mobile station to automatically establish the voice call communication from the user's mobile station using the two or more telephone numbers included in the call scheduling request message for the two or more other parties intended to be on the call.

2. The method of claim 1, wherein the mobile messaging service message causing the user's mobile station to establish the voice call communication includes a code for automatically causing the mobile station to activate on the mobile station an application for initiating the call.

3. The method of claim 1, wherein the automatically initiating set-up for the voice call communication is performed at the scheduled time included in the call scheduling request.

4. The method of claim 1, wherein the mobile messaging service message is a Short Message Service (SMS) message.

5. A Short Message Service Center (SMSC) for providing a call scheduling and automatic call set-up service, comprising:
   an interface for communications, including at least communications through a mobile communication network;
   a programmable processor responding to and controlling communications of the SMSC through the interface;
   at least one storage device accessible by the processor; and
   programming for the processor stored in the at least one storage device,
   wherein the programming configures the processor so that the SMSC is capable of performing operations, including operations to:
      receive a call scheduling request, sent as a mobile messaging service message addressed to a short code from a user's mobile station through a mobile communication network, wherein the call scheduling request includes a scheduled time for the call and two or more telephone numbers for enabling communication with at least two other parties intended to be on the call;
      identify an application server associated with the short code to which the mobile messaging service message is addressed;
      route the mobile messaging service message through a packet network to a destination address of the identified application server associated with the short code;
      in response to the routing, receive from the identified application server through the packet network, a response to the call scheduling request message, wherein the response to the call scheduling request message is automatically transmitted by the application server to the SMSC at the scheduled time;

identify the user's mobile station identified in the response to the call scheduling request message; and route to the identified user's mobile station through the mobile communication network the response message to automatically initiate, at the scheduled time, set-up of a voice call communication for the user's mobile station using the two or more telephone numbers included in the call scheduling request message by sending a mobile messaging service message through the mobile communication network to the user's mobile station to cause the user's mobile station to automatically establish the voice call communication from the user's mobile station using the two or more telephone numbers included in the call scheduling request message for the two or more other parties intended to be on the call.

6. The SMSC of claim 5, wherein:

the interface enables Internet Protocol (IP) communications through a packet network; and the programming configures the server to route the call scheduling request message through the packet network to the application server.

7. The SMSC of claim 5, wherein the automatically initiating set-up of a voice call communication configures the processor to automatically initiate set-up of the voice call communication at the scheduled time included in the call scheduling request.

8. A product of manufacture, comprising:

at least one non-transitory machine readable storage medium; and programming stored on the at least one medium for execution by one or more programmable processors, wherein execution of the processing by the one or more processors configures the one or more processors to schedule and set-up a voice call by performing functions comprising functions to:

receive a call scheduling request, sent as a mobile messaging service message addressed to a short code from a user's mobile station through a mobile communication network, wherein the call scheduling request includes a scheduled time for the call and two or more telephone numbers for enabling communication with at least two other parties intended to be on the call;

identify an application server associated with the short code to which the mobile messaging service message is addressed;

route the mobile messaging service message through a packet network to a destination address of the identified application server associated with the short code;

in response to the routing, receive from the identified application server through the packet network, a response to the call scheduling request message, wherein the response to the call scheduling request message is automatically transmitted by the application server at the scheduled time;

identify the user's mobile station identified in the response to the call scheduling request message; and route to the identified user's mobile station through the mobile communication network the response message to automatically initiate, at the scheduled time, set-up of a voice call communication for the user's mobile station using the two or more telephone numbers included in the call scheduling request message by sending a mobile messaging service message through the mobile communication network to the user's mobile station to cause the user's mobile station to automatically establish the voice call communication from the user's mobile station using the two or more telephone numbers included in the call scheduling request message for the two or more other parties intended to be on the call.

9. The product of claim 8, wherein the programming is server programming.

10. The product of claim 8, wherein the programming comprises server programming and programming for the user's mobile station.

11. The product of claim 8, wherein the automatically initiating set-up of a voice call communication enables the one or more processors to automatically initiate set-up of the voice call communication at the scheduled time included in the call scheduling request.

* * * * *